United States Patent
Love et al.

(10) Patent No.: US 9,413,395 B2
(45) Date of Patent: *Aug. 9, 2016

(54) INTER-MODULATION DISTORTION REDUCTION IN MULTI-MODE WIRELESS COMMUNICATION TERMINAL

(75) Inventors: Robert T. Love, Barrington, IL (US); Ravikiran Nory, Buffalo Grove, IL (US); Kenneth A. Stewart, Grayslake, IL (US); Ravi Kuchibhotla, Gurnee, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 492 days.

This patent is subject to a terminal disclaimer.

(21) Appl. No.: 13/006,096

(22) Filed: Jan. 13, 2011

(65) Prior Publication Data
US 2012/0184327 A1  Jul. 19, 2012

(51) Int. Cl.
*H04M 1/00* (2006.01)
*H04B 1/00* (2006.01)

(52) U.S. Cl.
CPC .................... *H04B 1/0064* (2013.01)

(58) Field of Classification Search
CPC ..... H04W 88/06; H04W 36/30; H04W 12/08; H04W 4/023; H04W 4/22; H04W 52/02; H04W 52/0219; H04W 52/0235; H04W 52/0245; H04W 52/04; H04W 52/367; H04W 72/04; H04W 72/0406; H04W 72/1263; H04W 84/045; H04W 92/14; H04W 88/10; H04W 88/12; H04W 88/181; H04W 52/262
USPC ...................................................... 455/552.1
See application file for complete search history.

(56) References Cited

U.S. PATENT DOCUMENTS

| 6,748,246 | B1 | 6/2004 | Khullar |
| 6,870,816 | B1 | 3/2005 | Edwards et al. |
| 7,688,784 | B2 | 3/2010 | Bitran et al. |
| 8,638,747 | B2 * | 1/2014 | Radhakrishnan et al. ..... 370/331 |

(Continued)

FOREIGN PATENT DOCUMENTS

| EP | 1569476 A1 | 8/2005 |
| EP | 1811683 A2 | 7/2007 |

(Continued)

OTHER PUBLICATIONS

Patent Cooperation Treaty, "PCT Search Report and Written Opinion of the International Searching Authority" for International Application No. PCT/US2011/054860 Feb. 21, 2012, 24 pages.

(Continued)

*Primary Examiner* — Nay A Maung
*Assistant Examiner* — Angelica M Perez
(74) *Attorney, Agent, or Firm* — Faegre Baker Daniels LLP

(57) ABSTRACT

A multimode wireless communication terminal that communicates using a first radio access technology (RAT) and a second RAT determines whether the first and second RATs are in an active state, and modifies a maximum transmit power limit of the first RAT based on a voice codec rate of a voice transmission on the second RAT when the first RAT and the second RAT are in the active state concurrently, wherein the second RAT is conducting the voice transmission in the active state. In an alternative embodiment, the limit is modified based on a transmit power status of the second RAT or on a transmission type of the first RAT.

19 Claims, 7 Drawing Sheets

(56) References Cited

U.S. PATENT DOCUMENTS

| | | | |
|---|---|---|---|
| 2004/0219920 A1* | 11/2004 | Love et al. | 455/442 |
| 2007/0173260 A1 | 7/2007 | Love et al. | |
| 2007/0173276 A1 | 7/2007 | Love et al. | |
| 2007/0202901 A1 | 8/2007 | Hulbert | |
| 2007/0254598 A1 | 11/2007 | Bachl et al. | |
| 2008/0025254 A1 | 1/2008 | Love et al. | |
| 2008/0062920 A1 | 3/2008 | Pi et al. | |
| 2008/0165872 A1 | 7/2008 | Kwon et al. | |
| 2008/0229177 A1 | 9/2008 | Kotecha | |
| 2009/0046573 A1 | 2/2009 | Damnjanovic | |
| 2009/0092103 A1 | 4/2009 | Rao | |
| 2009/0180451 A1* | 7/2009 | Alpert et al. | 370/338 |
| 2009/0196245 A1 | 8/2009 | Ji | |
| 2009/0209256 A1 | 8/2009 | Nakashima et al. | |
| 2010/0029289 A1 | 2/2010 | Love et al. | |
| 2010/0061326 A1 | 3/2010 | Lee et al. | |
| 2010/0234071 A1* | 9/2010 | Shabtay et al. | 455/562.1 |
| 2010/0260147 A1 | 10/2010 | Xing et al. | |
| 2011/0158117 A1 | 6/2011 | Ho et al. | |
| 2012/0088455 A1* | 4/2012 | Love et al. | 455/67.11 |
| 2012/0176923 A1* | 7/2012 | Hsu et al. | 370/252 |
| 2012/0178448 A1* | 7/2012 | Yuk | H04W 88/06 455/435.1 |
| 2012/0178494 A1* | 7/2012 | Haim et al. | 455/522 |
| 2012/0184265 A1* | 7/2012 | Love et al. | 455/424 |
| 2013/0089055 A1* | 4/2013 | Keevill et al. | 370/329 |

FOREIGN PATENT DOCUMENTS

| | | |
|---|---|---|
| WO | 2006095224 A1 | 9/2006 |
| WO | 2010090567 A1 | 8/2010 |
| WO | WO 2010090567 * | 8/2010 |

OTHER PUBLICATIONS

H 3GPP TSG RAN WG #71, R2-104444 "Analysis in In-Device Coexistence Interference Avoidance" MediaTek, Madrid, Spain, Aug. 23-37, 2010, 10 pages.

3GPP TSG RAN WG2 #71bis, R2-105575 "Effect of In-Device coexistence on LTE current Implementations" Samsung, Xian, China, Oct. 11-15, 2010, 4 pages.

3GPP TSG RAN #51, R4-091797 "Power Control Alignment" Motorola, San Francisco, USA, May 4-8, 2009, 10 pages.

3GPP TSG RAN WG2 #71, R2-104809 "Further Considerations on In-device Coexistence Interference Avoidance" Motorola, Madrid, Spain, Aug. 23-27, 2010, 2 pages.

3GPP TSG RAN WG3 #71, R2-105211 "Problem Scenarios and Proposed Solutions for In-device Coexistence" Qualcomm Incorporated, Madrid, Spain, Aug. 23-27, 2010, 4 pages.

Love et al., "Inter-Modulation Distortion Reduction in Multi-Mode Wireless Communication Device" U.S. Appl. No. 13/251,800, filed Oct. 3, 2011.

QUALCOMM Europe: "Signaling for spatial coordination in DL CoMP", 3GPP TSG-RAN WG1 #58, R1-093141, Aug. 24-28, 2009, Shenzhen, China, all pages.

Motorola: "EUTRA Uplink Macro-diversity", 3GPP TSG RAN WG1 #42, R1-050717, London, U.K., Aug. 29-Sep. 2, 2005, all pages.

NTT DOCOMO: "Downlink Interference Coordination Between eNodeB and Home eNodeB", TSG-RAN Working Group 4 (Radio) meeting #52, R4-093203, Shenzhen, Aug. 24-28, 2009, all pages.

Institute for Information Industry (III), Coiler Corporation: "Interference mitigation for HeNBs by channel measurements", 3GPP TSG RAN WG4 Meeting #52, R4-093196, Shenzhen, China, Aug. 24-28, 2009, all pages.

CMCC: "Downlink interference coordination between HeNBs", 3GPP TSG-RAN WG4 Meeting #52, R4-092872, Shenzhen, China, Aug. 24-28, 2009, all pages.

Korean Intellectual Property Office "Notice of Preliminary Rejection" for Korean Application No. 10-2012-0004067 mailed Jun. 12, 2013, 3 pages translated.

United States Patent & Trademark Office, "Non-Final Office Action" for U.S. Appl. No. 13/251,800 dated Apr. 26, 2013, 9 pages.

* cited by examiner

INTER-MODULATION DISTORTION REDUCTION IN MULTI-MODE WIRELESS COMMUNICATION TERMINAL

FIELD OF THE DISCLOSURE

The present disclosure relates generally to wireless communications and, more particularly, to the avoidance or reduction of inter-modulation (IM) distortion in multimode wireless communication terminals and corresponding methods.

BACKGROUND

The introduction of new wireless radio access technologies usually occurs in stages due to financial and logistical considerations. For example, it is common for evolved radio access technology (RAT) infrastructure to be implemented initially in areas with higher population density amidst existing radio access technology infrastructure. Such implementations often require multi-mode user terminals supporting the different radio access technologies. The emerging 3GPP LTE radio access technology will be likely be implemented using multimode user equipment (UE) that supports OFDM and CDMA technologies operating simultaneously in neighboring frequency bands. In the United States, for example, simultaneous activation (i.e., uplink transmission) of a CDMA RAT operating at 850 MHz and an OFDM RAT operating at 700 MHz may result in desense of one or the other radio access technologies.

Emerging broadband wireless networks such as 3GPP LTE must solve the problems of minimizing the power amplifier (PA) power consumption (or peak and/or mean current drain), cost and the complexity required to deliver a specified conducted power level in the context of new modes of system operation. For example, PA performance must be optimized in the presence of numerous different frequency or spatially adjacent radio access technologies, including GSM, UMTS, WCDMA, unlicensed transmitter and receivers, among other radio access technologies.

Exemplary cellular communication networks include 2.5 Generation 3GPP GSM networks, 3rd Generation 3GPP WCDMA networks, and 3GPP2 CDMA communication networks, among other existing and future generation cellular communication networks. Future generation networks include the developing Universal Mobile Telecommunications System (UMTS) networks, Evolved Universal Terrestrial Radio Access (E-UTRA) networks. The network may also be of a type that implements frequency-domain oriented multi-carrier transmission techniques, such as Frequency Division Multiple Access (OFDM), DFT-Spread-OFDM (DFT-SOFDM), Interleaved Frequency Division Multiple Access (IFDMA), etc., which are of interest for future systems. Single-carrier based approaches with orthogonal frequency division (SC-FDMA), particularly IFDMA and its frequency-domain related variant known as DFT-SOFDM, are attractive in that they optimize performance when assessed using contemporary waveform quality metrics, which may include peak-to-average power ratio (PAPR) or the so-called cubic metric (CM).

In OFDM networks, both Time Division Multiplexing (TDM) and Frequency Division Multiplexing (FDM) are employed to map channel-coded, interleaved and data-modulated information onto OFDM time/frequency symbols. The OFDM symbols can be organized into a number of resource blocks consisting of M consecutive sub-carriers for a number N consecutive OFDM symbols where each symbol may also include a guard interval or cyclic prefix (CP). An OFDM air interface is typically designed to support carriers of different bandwidths, e.g., 5 MHz, 10 MHz, etc. The resource block size in the frequency dimension and the number of available resource blocks are generally dependent on the bandwidth of the system.

User equipment operating in a cellular network operate in a number of 'call states' or 'protocol states' generally conditioned on actions applicable in each state. For example, in a mode typically referred to as an 'idle' mode, a UE may roam throughout a network without necessarily initiating or soliciting uplink or downlink traffic, except, e.g., to periodically perform a location update to permit efficient network paging. In another such protocol state, the UE may be capable of initiating network access via a specified shared channel, such as a random access channel (RACH). A UE's ability or need to access physical layer resources may be conditioned on the protocol state. In some networks, for example, the UE may be permitted access to a shared control channel only under certain protocol-related conditions, e.g., during initial network entry. Alternatively, a UE may have a requirement to communicate time-critical traffic, such as a handover request or acknowledgement message, with higher reliability.

The various aspects, features and advantages of the invention will become more fully apparent to those having ordinary skill in the art upon careful consideration of the following Detailed Description thereof with the accompanying drawings described below. The drawings may have been simplified for clarity and are not necessarily drawn to scale.

DETAILED DESCRIPTION

In wireless communication system comprising different radio access technologies, each RAT generally includes corresponding radio access networks and in some implementations corresponding core networks. An access network typically includes one or more base stations that serve user terminals in corresponding cellular areas or regions, wherein the one or more access network communicably coupled to a controller. The core network generally provides switching and routing functionality for user traffic. In some systems, multiple access networks may share a common core network and in other systems multiple core networks may share a common access network. Other networks could be configured differently. In one example described below, one RAT is OFDM based, for example, 3GPP LTE, and the other RAT is CDMA based, for example 1xRTT (CDMA 1x). More generally, however, the different radio access technologies may be any technologies that operate in or on neighboring or overlapping frequencies that result in desense of one or the other radio access technologies. For example, operation of a transmitter on one RAT may result in desense of a receiver of another RAT.

Figure 1:
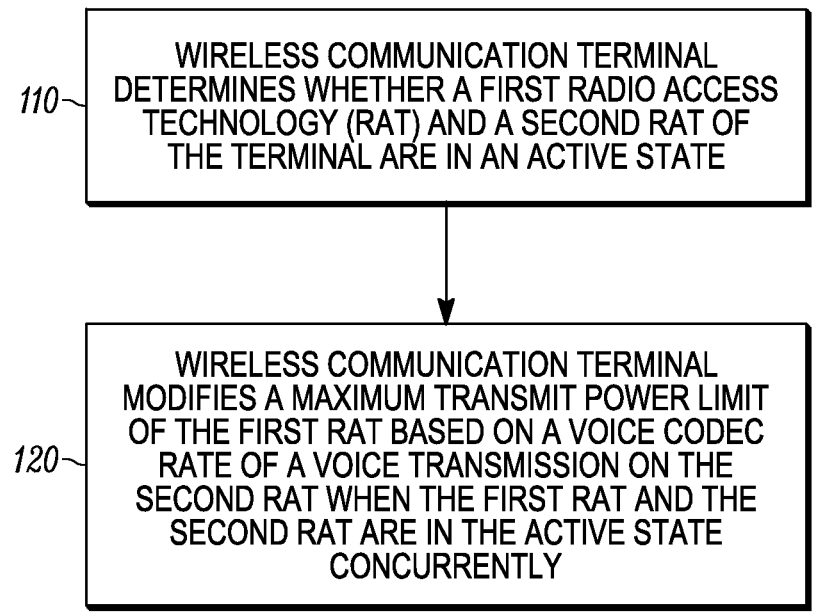
FIG. 1 illustrates a flow diagram of a process implemented in a multimode wireless communication terminal according to one aspect of the disclosure.

Generally, a wireless communication network infrastructure scheduling entity located allocates or assigns radio resources to schedulable wireless communication entities, e.g., mobile terminals, in the wireless communication network. In FIG. 1, each base stations includes a scheduler for scheduling and allocating radio resources to mobile terminals in corresponding cellular areas. In multiple access schemes such as those based on OFDM methods, multi-carrier access or multi-channel CDMA wireless communication protocols including, for example, IEEE-802.16e-2005, multi-carrier HRPD-A in 3GPP2, and the Long Term Evolution (LTE) of UTRA/UTRAN Study Item in 3GPP (also known as evolved UTRA/UTRAN (EUTRA/EUTRAN)), scheduling may be performed in the time and frequency dimensions using a Frequency Selective (FS) scheduler. To enable FS scheduling by the scheduler, in some embodiments, each mobile terminal provides a per frequency band channel quality indicator (CQI) to the scheduler.

In OFDM systems, a resource allocation is a frequency and time allocation that maps information for a particular UE to resource blocks as determined by the scheduler. This allocation depends, for example, on the frequency-selective channel-quality indication (CQI) reported by the UE to the scheduler. The channel-coding rate and the modulation scheme, which may be different for different resource blocks, are also determined by the scheduler and may also depend on the reported CQI. A UE may not be assigned every sub-carrier in a resource block. It could be assigned every Qth sub-carrier of a resource block, for example, to improve frequency diversity. Thus a resource assignment can be a resource block or a fraction thereof. More generally, a resource assignment is a fraction of multiple resource blocks. Multiplexing of lower-layer control signaling may be based on time, frequency and/or code multiplexing.

The radio resource allocated to a schedulable wireless communication entity is based on an interference impact of the schedulable wireless communication entity operating on the radio resource allocated. The interference impact may be based on any one or more of the following factors: a transmission waveform type of the schedulable wireless communication entity; a maximum allowed and current power level of the schedulable wireless communication entity; bandwidth assignable to the schedulable wireless communication entity; location of the assignable bandwidth in a carrier band; radio frequency distance (path loss) relative to another wireless communications entity; variation in the maximum transmit power of the schedulable wireless communication entity for the assigned bandwidth; separation of assigned band relative to the other wireless communication entity; reception bandwidth of the victim entity, minimum SNR required for operation of the victim entity; and reception multiple access processing (e.g., CDMA, OFDM, or TDMA), among other factors. The variation in the maximum transmit power includes de-rating or re-rating the maximum transmit power of the wireless communication entity as discussed below.

For a given carrier band and band separation, transmissions with larger occupied bandwidth (OBW) create more out of band emissions resulting in a larger adjacent or neighbor channel leakage ratio (ACLR) than transmissions with smaller OBW. To avoid the relative increase in ACLR, it is generally necessary to reduce or de-rate transmission power created by the interfering entity. This can be generally achieved by applying a Maximum Power Reduction (MPR) and an optional additional Maximum Power Reduction (A-MPR) to the maximum power of the mobile terminal. If $P_{MAX}$ is the maximum power at which the mobile terminal is capable of transmitting, applying an MPR and A-MPR will reduce the maximum power at which the terminal can transmit to $P_{MAX}$-MPR-AMPR.

It is known for the scheduler to allocate the radio resource based on the interference impact by assigning bandwidth based on power headroom of the schedulable wireless communication entity. Particularly, the scheduler can find a bandwidth size that reduces required MPR and A-MPR enough such that operational maximum power ($P_{MAX}$-MPR-AMPR) does not limit current power of the schedulable wireless communication entity.

A scheduler may also control leakage into adjacent and non-contiguous adjacent bands by scheduling mobile terminals that are "close" to the serving cell in terms of path loss with bandwidth allocations that occupy the entire carrier band or a bandwidth allocation that includes resource blocks (RBs) that are at the edge of the carrier band (e.g., 5 MHz UTRA or LTE carrier) since due to power control it is very unlikely that such a terminal will be operating at or near to $P_{MAX}$ and therefore unlikely that its current power level would be limited by the operational maximum power ($P_{MAX}$-MPR-AMPR). A scheduler may schedule terminals that have little or no power margin with bandwidth allocations that exclude resource blocks at the carrier band edge reducing the likelihood of the terminal being power limited by the operational maximum power. In systems having different networks that are run independently, such as CDMA 1x and LTE networks, the scheduler supporting one radio access technology in one network operates independently of the scheduler supporting a different radio access technology in the other network. A multimode UE may then need to transmit over the two radio access technologies at the same time.

The power radiated into an adjacent frequency band by a UE, and the distortion offered by a UE to a another UE is governed by several design criteria related to the implementation of mobile terminal transmitters, including oscillator phase noise, digital-analog converter (DAC) noise, power amplifier (PA) linearity (in turn controlled by power amplifier mode, cost, power consumption etc.), among others.

Generally, however, and in common with most non-linear transformations expandable in terms a polynomial power series, UE power amplifiers give rise to undesired adjacent band interference in broad proportion, for a given PA design, to the mean power offered to the PA input. As a consequence of $3^{rd}$ or $5^{th}$ order polynomial terms, the frequency at which interference occurs is at 3 or 5 times the frequency of the input signal components, or harmonics thereof. Also, the power of such out-of-band components generally increases at 3 or 5 times the rate of increase of the input power level.

Accordingly, mobile terminals may control their out of band emission levels by limiting the power to the PA. Given a specific rated maximum output (or input) power level designed to achieve a given level of interference into an adjacent frequency band, or level of in-band distortion, a mobile terminal may elect to adjust, for example, reduce its input, power level in order to reduce such unwanted effects. The mobile terminal may also keep its power at a given level, but adjust its operating point (load, bias, supply, etc.) to effect adjustment of the emission levels. As described elsewhere herein, a decision to increase or decrease the input or output PA power may be subject to other criteria, including waveform bandwidth, location in a frequency band, waveform quality metric, among other considerations.

In a dual RAT UE transmitting on both RATs simultaneously, the UE might need to apply a large maximum power reduction at all times. For the case where a CDMA 1x transmitter is interfering with an LTE receiver, such a reduction may be required on an LTE RAT to avoid LTE receiver desense in the event that both RATs (e.g., CDMA at 850 MHz band and LTE at 700 MHz band) are active (e.g., simultaneous uplink transmission on both RATs). In FIG. 1, according to one aspect of the disclosure, a multimode wireless communication terminal that communicates using a first radio access technology (RAT) and a second RAT determines, at 110, whether the first RAT and the second RAT are in an active state. A RAT is in an active state if the corresponding UE has been assigned a temporary identifier for communicating with a network on the RAT or if the UE has a context in the base station. The context includes the temporary identifier of the UE in the base station and information related to the traffic being supported through the base station such as protocol stack configuration, etc.

In FIG. 1, at 120, when both the first RAT and the second RAT are in the active state at the same time, the wireless communication terminal modifies a maximum transmit power limit of the first RAT based on a voice codec rate of a voice transmission on the second RAT, wherein the second RAT is conducting the voice transmission in the active state. The wireless communication terminal then transmits at a transmit power level on the first RAT based on the modified maximum transmit power limit. For example, the terminal transmits at the modified transmit power level when the voice transmission is conducted on the second RAT.

Figure 2:
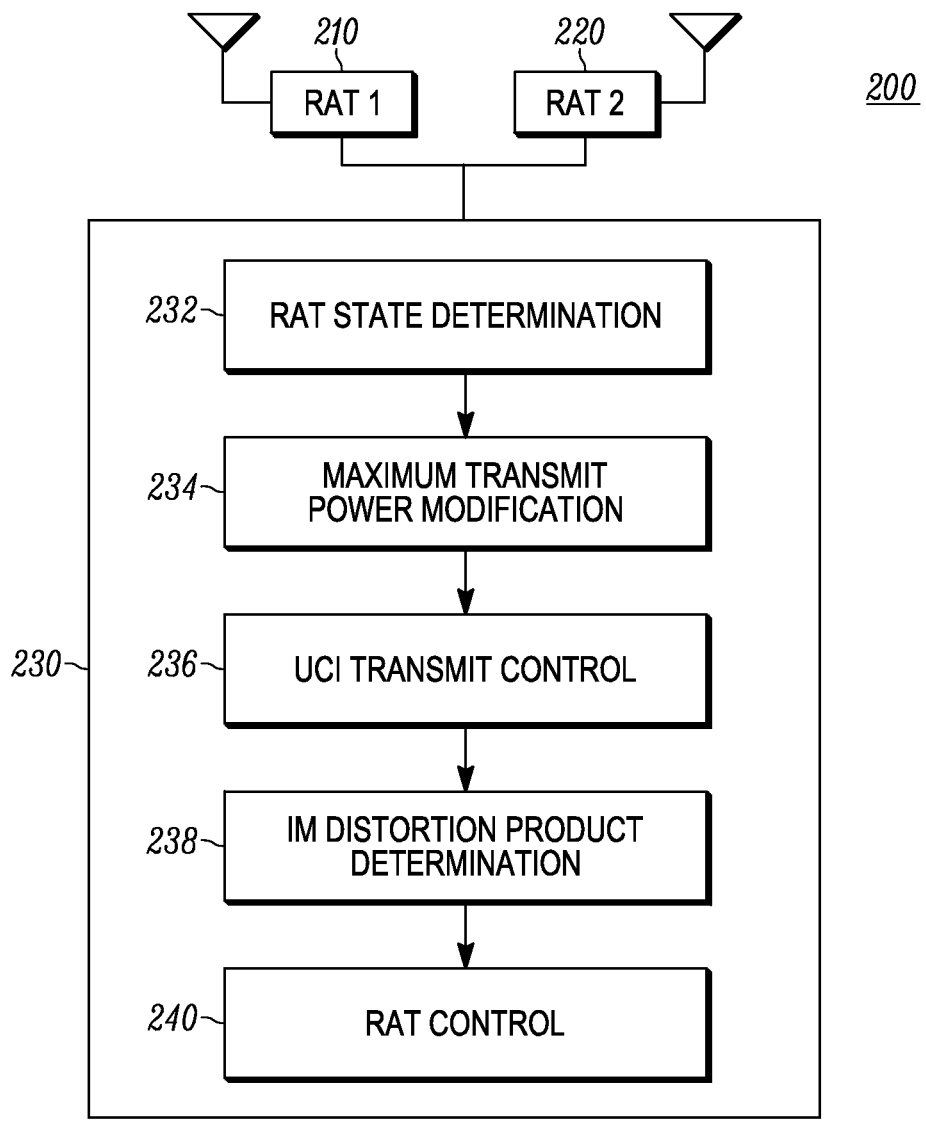
FIG. 2 illustrates a schematic block diagram of a multimode wireless communication terminal.

FIG. 2 illustrates a multimode terminal or UE 200 comprising a first RAT transceiver 210 and a second RAT transceiver 220 communicably coupled to a controller 230. The transceivers may implement any wireless communication protocols, as discussed above, and may be capable of conducting circuit or packet switched communications or both. The UE may also comprise other elements for performing other functionality typically associated with wireless communication terminals, including but not limited to user interface elements. These and other elements of such terminals are well known to those of ordinary skill in the art and are not described further herein.

In the multimode terminal of FIG. 2, the controller is configured to perform RAT state determination functionality 232 by implementing instructions stored in a memory device constituting the terminal. More particularly, the controller determines whether the first and second RATS are in the active state as defined herein. Alternatively, the RAT state determination functionality may be performed by implementing equivalent hardware circuits or by implementing some other combination of software controlled hardware elements. The controller is also configured generally, to perform maximum transmit power modification 234. In the embodiment of FIG. 2, the controller modifies the maximum transmit power of the first RAT based on a voice codec rate of a voice transmission on the second RAT when the first RAT and the second RAT are in the active state concurrently.

In one implementation, the maximum transmit power limit of the first RAT is modified based on the voice codec rate of the second RAT by increasing the maximum transmit power limit of the first RAT when the second RAT conducts the voice transmission using a relatively low voice codec data rate. In another implementation, the maximum transmit power limit of the first RAT is decreased when the second RAT conducts the voice transmission using a relatively high voice codec data rate.

In another embodiment, the wireless communication terminal modifies a maximum transmit power limit of the second RAT when modifying the maximum transmit power limit of the first RAT, when the first RAT and the second RAT are in the active state at the same time.

In another embodiment, the wireless communication terminal changes the maximum transmit power limit of the first RAT during a silence period of the voice transmission relative to a non-silence period of the voice transmission, when the first RAT and the second RAT are in the active state at the same time. In a more particular implementation, the maximum transmit power limit of the first RAT is increased during the silence period of the voice transmission. In an alternative implementation, the terminal reduces the maximum transmit power limit of the second RAT during the silence period of the voice transmission.

A silence period is characterized by no transmission due to a UE going into a quasi-idle state (e.g., a DRX state in LTE), which might occur between some packet transmissions, e.g., voice transmissions. A silence period can also reflect voice inactivity that occurs during talk spurts due, e.g., to pauses by the speaker or the speaker listening to the other caller. Some codecs (e.g., AMR) characterize this inactivity by sending a Silence Information Descriptor (SID) voice packet with relatively few bits (e.g., 39 bits including packet overhead) compared to a normal voice packet corresponding to speech (voice activity) which will typically carry 200 hundred bits or more. In other codecs, (like EVRC), that dynamically switch rates based on voice activity and the amount of speech information contained in the speaker's utterances, a much lower coding rate (e.g., 1200 bps) is used for the silence or inactivity period compared to the active period (e.g., 9600 bps).

The terminal is typically configured to send reports indicating its available power headroom to assist the scheduler in the base station to allocate resources in an appropriate manner. In order to provide new information, distinct from the original intent of the report there may be new agreements that certain report field values or states or combinations thereof are to be interpreted differently. Further conditions might include UE status or call state or configured modes or power status or buffer status or currently transmitted sub-frame/ frame type (e.g., $8^{th}$ rate frame versus full rate frame or whether data or control is being transmitted) or even multiple occurrences of a report or report type in the same transmitted sub-frame or frame.

Figure 3:
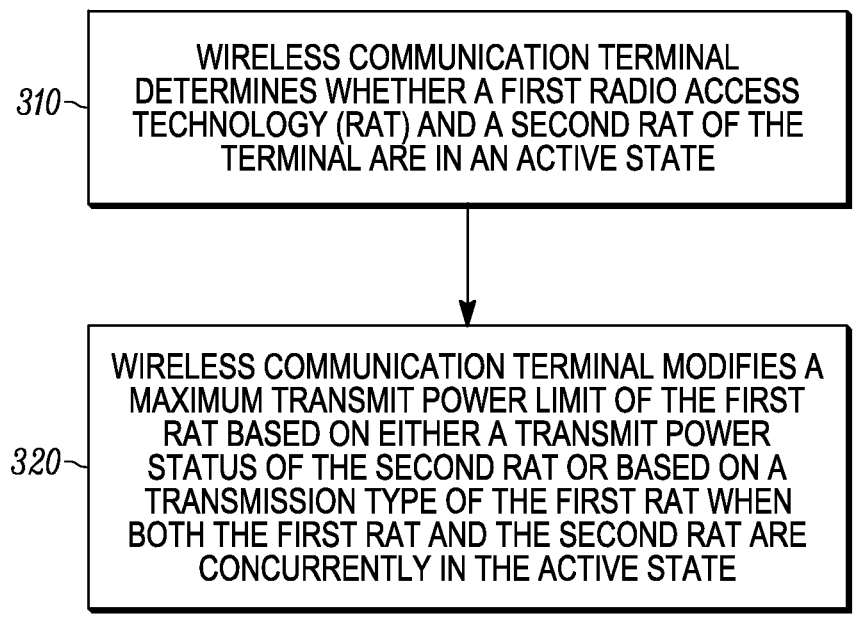
FIG. 3 illustrates a flow diagram of a process implemented in a multimode wireless communication terminal according to another aspect of the disclosure.

In FIG. 3, according to another aspect of the disclosure, a multimode wireless communication terminal that communicates using a RAT and that communicates using a second RAT determines, at 310, whether the first RAT and the second RAT are in an active state, as described herein. In FIG. 3, at 320, when both the first RAT and the second RAT are in the active state at the same time, the wireless communication terminal modifies a maximum transmit power limit of the first RAT based on either a transmit power status of the second RAT or based on a transmission type of the first RAT when both the first RAT and the second RAT are concurrently in the active state.

In FIG. 2, the controller 230 is configured to perform the maximum transmit power modification according to this embodiment by implementing instructions stored in memory or using equivalent circuitry. The terminal may then transmit at a power level on the first RAT based on the modified maximum transmit power limit when the first RAT and the second RAT are in the active state concurrently. In the embodiment, of FIG. 3, the criteria on which the maximum transmit power is modified is different than the modification criteria of FIG. 1. The controller may generally be programmed to modify the maximum transmit power based on any one or more of the criterion used in the embodiments of FIGS. 1 and 3, namely, the voice codec rate, or the transmit power status, or the transmission type, or some combination of these elements.

In one embodiment, the transmission type on the first RAT may be either a control transmission or a data transmission. The transmission type on the first RAT may also be either a frequency hopping transmission or a non-frequency hopping transmission. In another embodiment, the terminal increases the maximum transmit power limit of the first RAT when the transmission type of the first RAT is a control transmission. In a related embodiment, the maximum transmit power limit of the first RAT is increased and the maximum transmit power limit of the second RAT is decreased when the transmission type of the first RAT is a control transmission. In one embodiment when the transmission type of the first RAT is a data transmission, the maximum transmit power limit of the first RAT is decreased and a maximum transmit power limit of the second RAT is increased.

In one embodiment, the transmit power status of the second RAT is selected from a group comprising: a transmit power headroom of the second RAT; a transmit power level of the second RAT; and a maximum transmit power limit of the second RAT. According to this embodiment, the transmit power status of the second RAT could be a transmit power level of the second RAT, or a transmit power headroom of the second RAT, or a maximum transmit power limit of the second RAT.

In one implementation, the modification of the maximum transmit power limit of the first RAT occurs over only a single slot of a sub-frame wherein only the single slot includes transmissions in frequency resources that desense the second RAT whereas one or more other slots of the sub-frame do not include transmissions in frequency resources that desense the second RAT.

Figure 4:
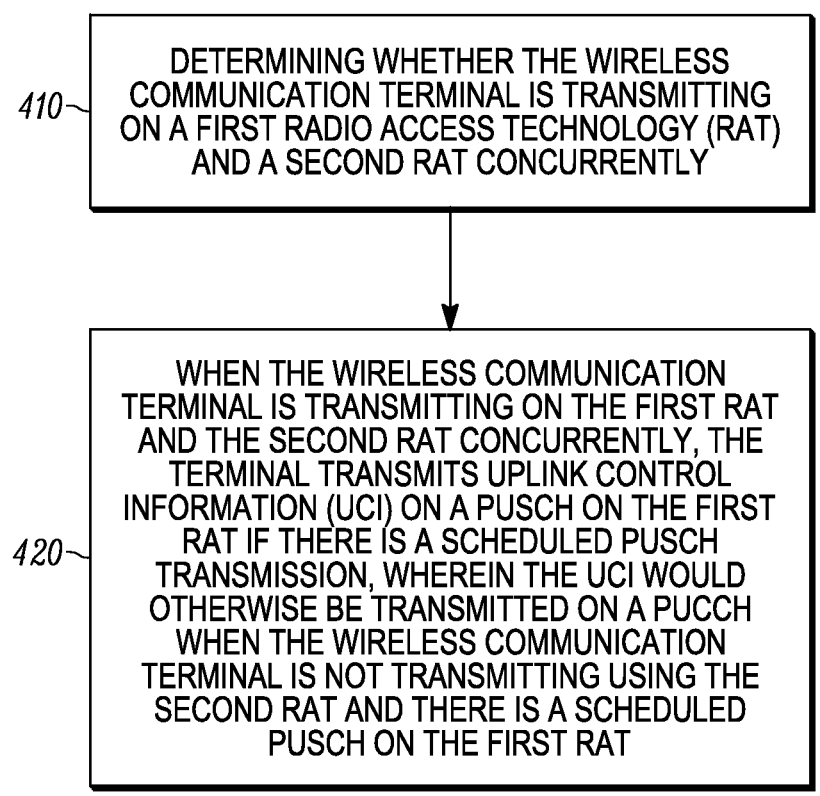
FIG. 4 illustrates a flow diagram of a process implemented in a multimode wireless communication terminal according to another aspect of the disclosure.

In FIG. 4, according to another aspect of the disclosure, a multimode wireless communication terminal that communicates using a first radio access technology (RAT) and a second RAT determines, at 410, whether the first RAT and the second RAT are in an active state. At 420, when the wireless communication terminal is transmitting on the first RAT and the second RAT concurrently, the terminal transmits uplink control information (UCI) on a PUSCH on the first RAT if there is a scheduled PUSCH transmission, wherein the UCI would otherwise be transmitted on a PUCCH when the wireless communication terminal is not transmitting using the second RAT while transmitting on the first RAT and there is a scheduled PUSCH on the first RAT.

The PUCCH is used to transmit uplink control information (UCI) to the network. The PUCCH is used to convey CQI information, ACK/NACK information, etc. The UCI may piggy back over a PUSCH in case of simultaneous PUCCH and PUSCH allocations in the same sub-frame. This is necessary to preserve the single carrier nature of the uplink waveform. Simultaneous PUCCH and PUSCH transmissions over separate uplink allocations are generally allowed. In the case of a dual RAT supporting terminal, and the terminal is transmitting on both the RATs simultaneously, the uplink transmissions on the two RATs can create IM distortion products that fall in the resource allocations for the PUCCH. In case of a dual-RAT terminal where both the RATs are in active state simultaneously, typically the service supported over one RAT is of higher priority than the service supported over the other RAT. For example, a voice session may be supported over one RAT and the other RAT support a non-voice session. In such cases it is useful to be able to control the communications for the data session such that the voice session is given preference. This could lead to non-voice packets being dropped occasionally and voice session being given preference instead.

In other cases, it might be desirable to convey UCI over one RAT that is supporting a data session and reduce the codec rate of the voice session such that both RAT transmissions can be simultaneously supported while still controlling the effect of IM distortion products created due to the simultaneous transmissions. Thus, depending on the situation, it might be useful to give preference to control information over user data, or to give preference to high priority traffic such as voice traffic over lower priority traffic such as non-voice (e.g., file transfer, e-mail, etc.).

In FIG. 2, at 236, the controller includes UCI transmit control functionality according to this embodiment by implementing instructions stored in memory or using equivalent circuitry. In one embodiment, the UCI is transmitted on the PUSCH only when an allocation for the PUSCH for the UCI transmission does not overlap desense resource blocks on the first RAT. The implementation of the embodiment of FIG. 4 may be independent of the embodiments of FIGS. 1 and 3. Thus in embodiments where the terminal does not modify maximum transmit power, the controller in FIG. 2 need not implement the functionality 234. In other embodiments, however, the maximum transmit power modification and UCI transmit control aspects of the disclosure may be implemented by a particular terminal.

According to a related aspect of the embodiment illustrated in FIG. 4, the wireless communication terminal transmits an indication that the first RAT and the second RAT are concurrently active. Such a transmission may be made to a base station serving the terminal on the first or second RAT. In one implementation, the indication includes a bit field indicating that the first RAT and the second RAT are concurrently active. The base station on receiving such an indication can schedule the terminal appropriately for example, it can schedule the terminal outside the desense RBs.

Figure 5:
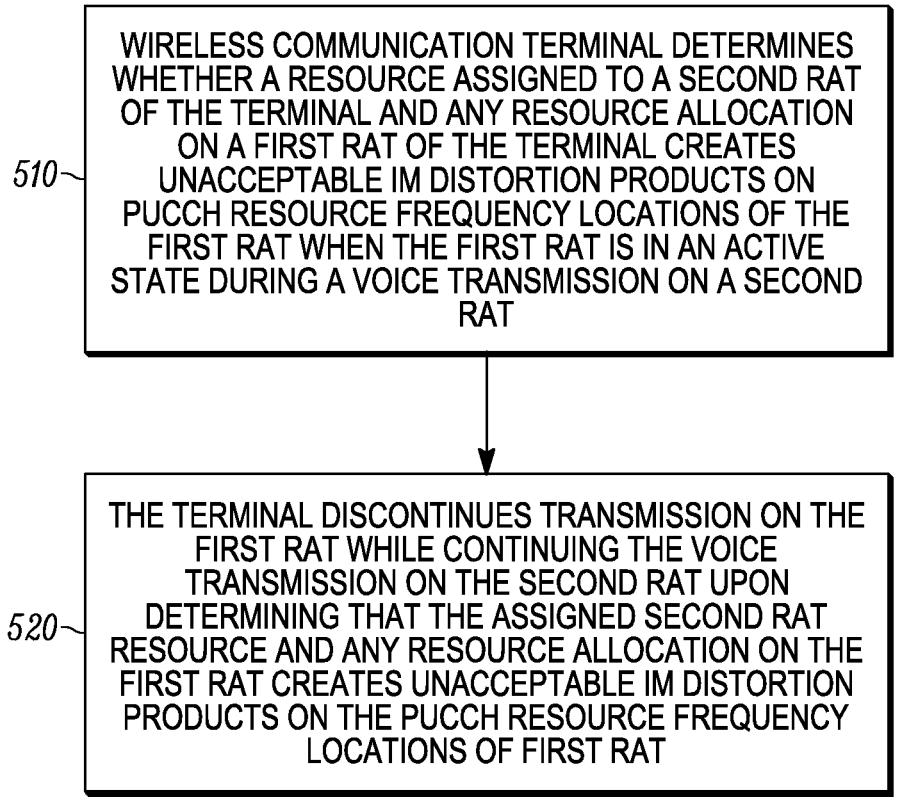
FIG. 5 illustrates a flow diagram of a process implemented in a multimode wireless communication terminal according to another aspect of the disclosure.

In FIG. 5, according to another aspect of the disclosure, a multimode wireless communication terminal that communicates using a first radio access technology (RAT) and a second RAT determines, at 510, whether an assigned second RAT resource and any resource allocation on the first RAT creates unacceptable inter-modulation (IM) distortion products on physical uplink control channel (PUCCH) resource frequency locations of the first RAT when the first RAT is in an active state during a voice transmission on the second RAT. In FIG. 2, the controller determines, at 238, IM distortion products acceptability functionality according to this embodiment by implementing instructions stored in memory or using equivalent circuitry. In one embodiment. The acceptability or unacceptability of the IM distortion products may be determined by comparison of the distortion products to a threshold.

In FIG. 5, at 520, the terminal discontinues transmission on the first RAT while continuing the voice transmission on the second RAT upon determining that the assigned second RAT resource and any resource allocation on the first RAT creates unacceptable IM distortion products on the PUCCH resource frequency locations of first RAT. In FIG. 2, the controller performs RAT control 240 functionality according to this embodiment by implementing instructions stored in memory or using equivalent circuitry.

Figure 6:
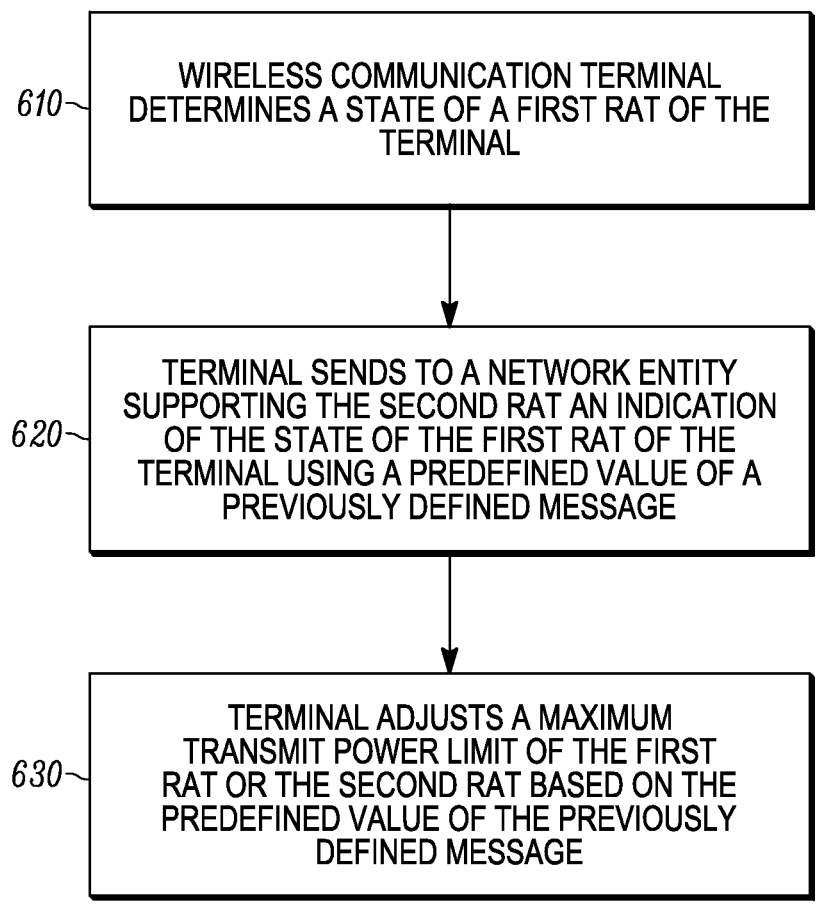
FIG. 6 illustrates a flow diagram of a process implemented in a multimode wireless communication terminal according to yet another aspect of the disclosure.

In FIG. 6, according to another aspect of the disclosure, a multimode wireless communication terminal that communicates using a first radio access technology (RAT) and a second RAT determines, at 610, determining a state of a first RAT of the terminal and more particularly whether the first RAT is in an active state. At 620, the terminal transmits to a network entity supporting the second RAT an indication of the state of the first RAT using a predefined value of a previously defined message. The message indicates to the network supporting the second RAT that the terminal is active on the other RAT. For example, a CDMA 1x/LTE multimode terminal would indicate to the LTE network, on which the LTE RAT of the terminal is conducting a non-voice session, that the terminal is also conducting a voice call or session on the CDMA 1x RAT. In some embodiments, transmitting the indication includes sending the previously defined message multiple times in a common uplink transmission sub-frame to indicate the state of the first RAT. At 630, the terminal adjusts a maximum transmit power limit of the first RAT or the second RAT based on the predefined value of the previously defined message.

Figure 7:
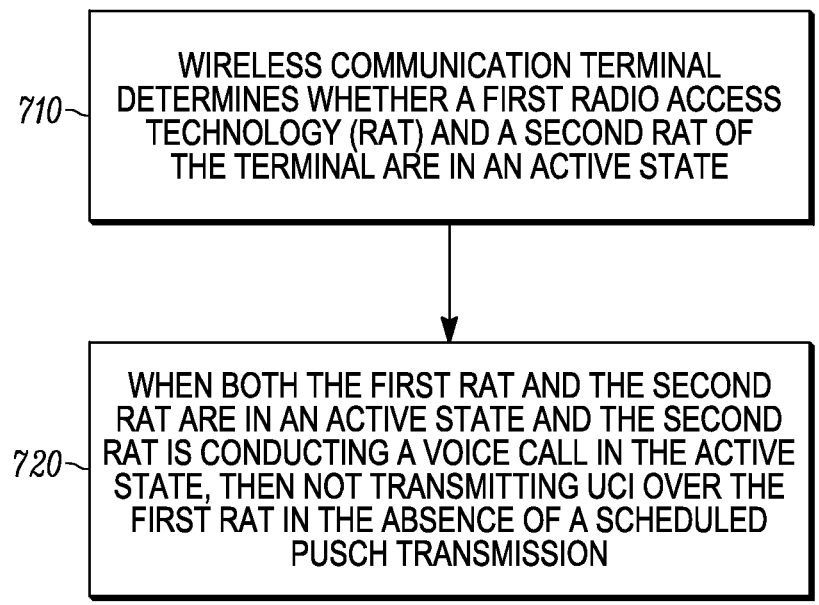
FIG. 7 illustrates a flow diagram of a process implemented in a multimode wireless communication terminal according to still another aspect of the disclosure.

According to another embodiment, the UCI information is sent on PUSCH to avoid desense of PUCCH RBs when both the first and second RAT are transmitting. Normally UCI is sent on the PUCCH. In FIG. 7, according to this aspect of the disclosure, a multimode wireless communication terminal that communicates using a first radio access technology (RAT) and a second RAT determines, at 710, determining whether the first RAT and the second RAT are in an active state. In the multimode terminal of FIG. 2, the controller is configured to perform RAT state determination functionality 232 by implementing instructions stored in a memory device or by equivalent hardware circuits.

In FIG. 7, at 720, when both the first RAT and the second RAT are in the active state and the second RAT is conducting a voice call in the active state, then not transmitting uplink control information (UCI) over the first RAT in the absence of a scheduled PUSCH transmission. Thus according to this embodiment, the terminal drops or discontinues UCI transmission on sub-frame n if no corresponding scheduling PUSCH grant is received on an earlier sub-frame, e.g., sub-frame n-4. According to this embodiment, a PUSCH must be scheduled before the UCI is transmitted over the PUSCH when the first RAT and the second RAT are active simultaneously. In some implementations, the UCI is transmitted on the scheduled PUSCH transmission only when the PUSCH resource allocation for the UCI transmission does not overlap desense RBs on a PUCCH.

In some network implementations, the wireless communication terminal transmits an indication to a network supporting the first RAT that both the first RAT and the second RAT are active. For example, in a CDMA 1x/LTE multimode terminal, the terminal would send such an indication to the network infrastructure entity supporting the LTE RAT. The indication would explain to the LTE network why UCI information has not been sent.

While the present disclosure and the best modes thereof have been described in a manner establishing possession and enabling those of ordinary skill to make and use the same, it will be understood and appreciated that there are equivalents to the exemplary embodiments disclosed herein and that modifications and variations may be made thereto without departing from the scope and spirit of the inventions, which are to be limited not by the exemplary embodiments but by the appended claims.

What is claimed is:

1. A method in a multimode wireless communication mobile terminal that communicates using a first radio access technology (RAT) and a second RAT, the method comprising:
   determining whether the multimode wireless communication mobile terminal has been assigned an identifier for simultaneously communicating with the first RAT and the second RAT;
   receiving an operational maximum power at which the multimode wireless communication mobile terminal can transmit on the first RAT;
   reducing the operational maximum power of the first RAT to a modified maximum transmit power based on a voice codec rate of a voice transmission on the second RAT when the multimode wireless communication mobile terminal has been assigned the identifier for simultaneously communicating with the first RAT and the second RAT; and
   transmitting on the first RAT at a transmit power level based on the modified maximum transmit power when the voice transmission is conducted by the second RAT.

2. The method of claim 1 further comprising increasing the modified maximum transmit power of the first RAT when the second RAT conducts the voice transmission using a relatively low voice codec data rate and decreasing the modified maximum transmit power of the first RAT when the second RAT conducts the voice transmission using a relatively high voice codec data rate.

3. The method of claim 1 further comprising modifying an operational maximum power of the second RAT when reducing the operational maximum power of the first RAT.

4. The method of claim 1, wherein reducing the operational maximum power of the first RAT to a modified maximum transmit power based on the voice codec rate of the voice transmission includes changing the operational maximum power of the first RAT during a silence period of the voice transmission relative to a non-silence period of the voice transmission.

5. The method of claim 4, wherein the modified maximum transmit power of the first RAT is increased during the silence period of the voice transmission.

6. The method of claim 4 further comprising reducing an operational maximum power of the second RAT during the silence period of the voice transmission.

7. The method of claim 1, wherein reducing the operational maximum power of the first RAT to a modified maximum transmit power further comprises applying a Maximum Power Reduction (MPR) to reduce the maximum power at which the terminal can transmit to the modified maximum transmit power.

8. The method of claim 7, wherein reducing the operational maximum power of the first RAT to a modified maximum transmit power further comprises applying an optional additional Maximum Power Reduction (A-MPR) to reduce the maximum power at which the terminal can transmit to the operational maximum power.

9. The method of claim 1 further comprising transmitting uplink control information (UCI) indicating that the first RAT and the second RAT are concurrently active to a base station serving the multimode wireless communication mobile terminal on the first or second RAT in response to determining that the multimode wireless communication mobile terminal is transmitting on the first RAT and the second RAT simultaneously.

10. The method of claim 1 wherein the received operational maximum power is received from a scheduler.

11. A method in a multimode wireless communication mobile terminal that communicates using a first radio access technology (RAT) and a second RAT, the method comprising:
  determining whether the multimode wireless communication mobile terminal has been assigned an identifier for simultaneously communicating with the first RAT and the second RAT;
  receiving an operational maximum power at which the multimode wireless communication mobile terminal can transmit on the first RAT;
  reducing the operational maximum power of the first RAT to a modified maximum transmit power based on either a transmit power status of the second RAT or a transmission type of the first RAT when the multimode wireless communication mobile terminal has been assigned the identifier for simultaneously communicating with both the first RAT and the second RAT; and
  transmitting on the first RAT at a transmit power level based on the modified maximum transmit power when the first RAT and the second RAT are in the active state concurrently.

12. The method of claim 11 wherein reducing the operational maximum power of the first RAT to a modified maximum transmit power only occurs over a single slot of a subframe wherein only the single slot includes transmissions in frequency resources that desense the second RAT whereas another slot of the subframe does not include transmissions in frequency resources that desense the second RAT.

13. The method of claim 11, wherein the transmission type of the transmission over the first RAT is either a control transmission or a data transmission.

14. The method of claim 11, further comprising increasing the operational maximum power of the first RAT when the transmission type of the first RAT is a control transmission.

15. The method of claim 11 further comprising increasing the operational maximum power of the first RAT and decreasing the operational maximum power of the second RAT when the transmission type of the first RAT is a control transmission.

16. The method of claim 11 further comprising decreasing the operational maximum power of the first RAT and increasing an operational maximum power of the second RAT when the transmission type of the first RAT is a data transmission.

17. The method of claim 11, wherein the transmit power status of the second RAT is selected from a group comprising: a transmit power headroom of the second RAT; a transmit power level of the second RAT; and an operational maximum power of the second RAT.

18. The method of claim 11, wherein reducing the operational maximum power of the first RAT to a modified maximum transmit power further comprises applying a Maximum Power Reduction (MPR) to reduce the maximum power at which the terminal can transmit to the operational maximum power.

19. The method of claim 18, wherein reducing the operational maximum power of the first RAT to a modified maximum transmit power further comprises applying an optional additional Maximum Power Reduction (A-MPR) to reduce the maximum power at which the terminal can transmit to the operational maximum power.

* * * * *